United States Patent
Arai

(10) Patent No.: US 6,503,415 B1
(45) Date of Patent: *Jan. 7, 2003

(54) MAGNET POWDERS AND ISOTROPIC RARE-EARTH BONDED MAGNETS

(75) Inventor: Akira Arai, Nagano-ken (JP)

(73) Assignee: Seiko Epson Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/472,140

(22) Filed: Dec. 23, 1999

(30) Foreign Application Priority Data

Dec. 28, 1998 (JP) .......................... 10-373585
Aug. 24, 1999 (JP) .......................... 11-236918

(51) Int. Cl.$^7$ .......................... C04B 35/04; H01F 1/057

(52) U.S. Cl. .......................... 252/62.54; 148/302

(58) Field of Search .......................... 148/301, 302; 252/62.54, 62.55

(56) References Cited

U.S. PATENT DOCUMENTS

| | | |
|---|---|---|
| 4,802,931 A | 2/1989 | Croat |
| 5,634,987 A | 6/1997 | Zhang et al. |
| 6,171,410 B1 * | 1/2001 | Kojima et al. .............. 148/302 |

FOREIGN PATENT DOCUMENTS

| | | |
|---|---|---|
| EP | 0 195 219 A2 | 9/1986 |
| EP | 0 362 812 A2 | 4/1990 |
| JP | 63-213324 | 9/1988 |
| JP | 4-120253 | 4/1992 |
| JP | 7-54106 * | 2/1995 |
| JP | 10-53844 | 2/1998 |

OTHER PUBLICATIONS

D. Goll, M. Seeger, H. Kronmüller, "Magnetic and Microstructural Properties of Nanocrystalline Exchange Coupled PrFeB Permanent Magnets", Journal of Magnetism and Magnetic Materials, Sep. 16, 1997, pp. 49–60.

(List continued on next page.)

*Primary Examiner*—John Sheehan
(74) *Attorney, Agent, or Firm*—Harness, Dickey & Pierce, P.L.C.

(57) ABSTRACT

Disclosed herein is a magnet powder which can provide a magnet having a high magnetic flux density and excellent magnetizability and reliability. The magnet powder is composed of an alloy composition represented by $R_x(Fe_{1-y}Co_y)_{100-x-z-w}B_zAl_w$ (where R is at least one kind of rare-earth element, x is 8.1–9.4 at %, y is 0–0.30, z is 4.6–6.8 at %, and w is 0.02–0.8 at %), and it has a structure in which a soft magnetic phase and a hard magnetic phase exist adjacent with each other. The magnet powder has characteristics in which, when an isotropic bonded magnet is molded by mixing the magnet powder with a binding resin, the magnetic flux density (B) of the bonded magnet, in the region of B higher than the straight line for Pc (permeance coefficient)=2.0 in the second quadrant of the B-H diagram representing the magnetic characteristics at room temperature, is found always on the upper side of the straight line representing Equation (I) below, and the intrinsic coercive force (iHc) of the magnet is in the range of 5.1–9.0 kOe:

$$B=1.25 \times \rho + 1.25 \times H \quad (I)$$

where B is the magnetic flux density, ρ is the density of the bonded magnet, and H is the magnetic field.

19 Claims, 10 Drawing Sheets

OTHER PUBLICATIONS

W. C. Chang and S H. Wu, B. M. Ma and C.O. Bounds, S.Y. Yao, "Magnetic Properties Enhancement of α–Fe/$Nd_2Fe_{14}B$–Type Nanocomposites by Co Substitution", Journal of Applied Physics, vol. 83, No. 4, Feb. 15, 1998, pp. 2147–2151.

B. Grieb, E.–Th. Henig, G. Martinek, H.H. Stadelmaier, and G. Petzow, "Phase Relations And Magnetic Properties Of New Phases In The Fe–No–Al And Fe–No–C Systems And Their Influence On Magnets", 8108 IEEE Transactions on Magnetics, Sep. 26, 1990, No. 5, New York, US, pp. 1367–1369.

"Prospects for Property Improvements in Isotropic Bonded Iron–rare Earth Magnets," 8th Int. Sypmosium on Magnetic Anistropy and Coercivity in Re–TM Alloys, pp. 465–474.

"Magnetic Properties of Nd–Fe–Co–V–B System Spring Magnets", Japan Electronic Materials Society, the 35th Autumn Lecture Conference, Lecture Summary Collection, Oct. 22,23, 1998.

* cited by examiner

MAGNET POWDERS AND ISOTROPIC RARE-EARTH BONDED MAGNETS

BACKGROUND OF THE INVENTION

1. Field of the Invention

The present invention relates to magnet powders and isotropic rare-earth bonded magnets.

2. Description of the Prior Art

For reduction in size of motors or other electrical devices, it is desirable to have a high magnetic flux density of a magnet when it is used in the motor or the like with the actual permeance. Factors determining the magnetic flux density of a bonded magnet employed in an electrical device are the magnetic performance (the magnetization, in particular) of the magnet powder used and the content (compositional ratio) of the magnet powder in the bonded magnet. Accordingly, when the magnetic performance (magnetization) of the magnet powder itself is not sufficiently high, a desired magnetic flux density cannot be obtained unless the content of the magnet powder in the bonded magnet is raised to an extremely high level.

At present, majority of high performance rare-earth bonded magnets in practical use are the isotropic bonded magnets made by using MQP-B powder manufactured by MQI Corp. as the rare-earth magnet powder. The isotropic bonded magnets are superior to the anisotropic bonded magnets in the following respect; namely, in the manufacture of the bonded magnet, the manufacturing process can be simplified because no magnetic field orientation is required, and as a result, the rise in the manufacturing cost can be restrained. However, the conventional isotropic bonded magnets represented by those manufactured by using MQP-B powder have the following disadvantages.

(1) With the conventional isotropic bonded magnets, it is not possible to secure a sufficiently high magnetic flux density. In other words, because of the insufficient magnetization of the magnet powder used, the content of the magnet powder in the bonded magnet has to be raised. However, the increase in the content of the magnet powder leads to the deterioration in the moldability of the bonded magnet, so there is a certain limit in this attempt. Moreover, even if the content of the magnet powder is somehow managed to be increased by manipulating the molding conditions or the like, there still exists a limit to the magnetic flux density obtainable, which stands in the way to the reduction of the size of the motor.

(2) Because of the high coercivity of the magnet powder, it has a poor magnetizability and requires a relatively high magnetic field for magnetization.

(3) Although there are reports on nanocomposite magnets having high remanent magnetic flux densities, their coercive forces, on the contrary, are so small that the magnetic flux densities (for the permeance in the actual use) obtainable for the practical motors are very low.

If the content of the conventional magnet powder in the bonded magnet is increased in order to enhance the magnetic flux density up to the upper limit (that is, if the density of the bonded magnet is made extremely high), then the following problems will show themselves up.

a) In the normal method of manufacture, either molding becomes difficult or the moldability is deteriorated. Because of this, there arise such necessities of, for example, limiting the molding method to the compression molding, raising the pressure and the temperature required for the molding, increasing the scale of the molding machine or introducing a specialized apparatus, or imposing strict restrictions on the type and composition for the binding resin to be used.

b) Reduction in the dimensional accuracy of the bonded magnet obtained due to deterioration in the moldability.

c) Reduction in the corrosion resistance and heat resistance of the bonded magnet obtained.

d) Brittleness of the bonded magnet obtained, which makes cracks and chippings liable to occur, resulting in the lack of sufficient mechanical strength.

SUMMARY OF THE INVENTION

It is therefore an object of the present invention to provide a magnetic powder that can produce a magnet having a high magnetic flux density and having excellent magnetizability and reliability and provide an isotropic bonded magnet formed from the magnetic powder.

In order to achieve the above object, the present invention is directed to a magnet powder having an alloy composition represented by $R_x(Fe_{1-y}Co_y)_{100-x-z-w}B_zAl_w$ (where R is at least one kind of rare-earth element, x is 8.1–9.4 at %, y is 0–0.30, z is 4.6–6.8 at %, and w is 0.02–0.8 at %), and a structure in which a soft magnetic phase and a hard magnetic phase exist adjacent with each other, wherein the magnet powder has characteristics in which, when an isotropic bonded magnet is molded by mixing the magnet powder with a binding resin, the magnetic flux density (B) of the bonded magnet, in the region of B higher than the straight line for Pc (permeance coefficient)=2.0 in the second quadrant of the B-H diagram representing the magnetic characteristics at room temperature, is found always on the upper side of the straight line representing Equation (I) below, and the intrinsic coercive force (iHc) of the magnet is in the range of 5.1–9.0 kOe:

$$B=1.25\times\rho+1.25\times H \qquad (I)$$

where B is the magnetic flux density, ρ is the density of the bonded magnet, and H is the magnetic field.

In the above magnet powder of the present invention, high magnetic flux density can be secured. Therefore, it is possible to obtain a bonded magnet with high magnetic performance even if it is isotropic. In particular, since magnetic performance equivalent to or better than the conventional isotropic bonded magnet can be obtained with a magnet of smaller volume as compared with the conventional isotropic bonded magnet, it is possible to provide a high performance motor of a smaller size.

Further, since a higher magnetic flux density can be secured, in manufacturing a bonded magnet sufficiently high magnetic performance is obtainable without pursuing a means for elevating the density of the bonded magnet. As a result, enhancement of the dimensional accuracy, mechanical strength, corrosion resistance, thermal resistance and the like can be attained along with the improvement in the moldability, so that it is possible to readily manufacture a bonded magnet with high reliability.

Furthermore, since the magnetizability of the magnet according to this invention is excellent, it is possible to magnetize a magnet with a lower magnetizing field. In particular, multipolar magnetization or the like can be accomplished easily and surely, and further a high magnetic flux density can be obtained.

Since a high density is not required to the bonded magnet, the present invention is adapted to the manufacture of the bonded magnet by the extrusion molding method or the injection molding method by which molding at high density is difficult as compared with the compression molding method, and the effects described in the above can also be realized in the bonded magnet manufactured by these molding methods. Accordingly, the latitude of selection of the molding method and the shape for the bonded magnet can be expanded.

In the magnet powder described above, it is preferred that said structure is a nanocomposite structure in which the soft magnetic phase and the hard magnetic phase exist adjacent with each other. In this case, it is also preferred that said R comprises rare-earth elements mainly containing Nd and/or Pr. Further, said R may include Pr and its ratio to the total mass of said R is 5–75%. Furthermore, said R may include Dy and its ratio to the total mass of said R is equal to or less than 10%.

Further, in the present invention, it is also preferred that the magnet powder is obtained by quenching a molten alloy. In this case, the magnet powder is obtained by pulverizing a quenched ribbon manufactured by using a cooling roll.

Furthermore, in the present invention, it is preferred that the magnet powder is subjected to a heat treatment for at least once during the manufacturing process or after its manufacture.

Moreover, it is also preferred that the average grain size of the magnet powder lies in the range of 0.5–150 μm.

The present invention is also directed to an isotropic rare-earth bonded magnet formed by binding magnet powder described above with a binding resin.

Another aspect of the present invention is also directed to an isotropic rare-earth bonded magnet formed by binding a magnet powder with a binding resin, wherein the isotropic rare-earth bonded magnet is characterized in that in the region with the magnetic flux density (B) higher than that represented by a straight line Pc (permeance coefficient)=2.0 in the second quadrant of the B-H diagram representing the magnetic characteristics at room temperature, the magnetic flux density of the bonded rare-earth magnet is always found on the upper side of the straight line representing Equation (I) below, and its intrinsic coercive force (iHc) lies in the range of 5.1–9.0 kOe:

$$B = 1.25 \times \rho + 1.25 \times H \qquad (I)$$

where B is the magnetic flux density, p is the density of the bonded magnet, and H is the magnetic field.

In this isotropic bonded magnet, it is preferred that said magnet powder has a structure in which a soft magnetic phase and a hard magnetic phase exist adjacent with each other. In this case, it is also preferred that said structure is a nanocomposite structure in which the soft magnetic phase and the hard magnetic phase exist adjacent with each other.

Further, it is preferred that the bonded magnet is one to be served for multipolar magnetization or is one already subjected to multipolar magnetization.

Preferably, the isotropic bonded magnet as described is used for a motor.

These and other objects, structures and advantages of the present invention will be apparent from the following detailed description of the invention and the examples taken in conjunction with the appended drawings.

DETAILED DESCRIPTION OF THE INVENTION

Figure 1:
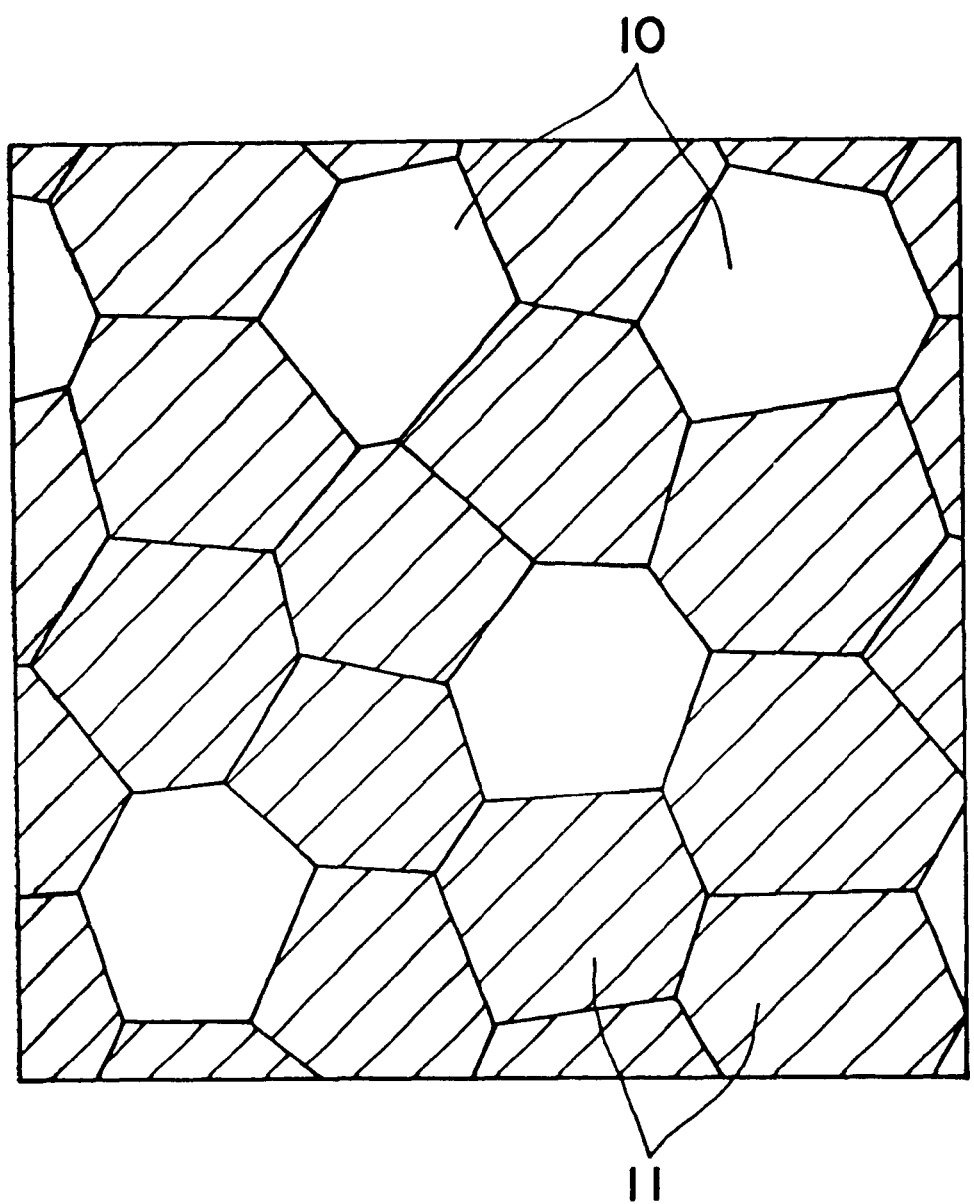
FIG. 1 is an illustration which schematically shows one example of a nanocomposite structure (macro structure) of a magnetic powder according to the present invention.

In the following, magnet powders according to this invention and the modes of embodiment of isotropic rare-earth bonded magnets using the powders will be described in detail.

BRIEF SUMMARY OF THE INVENTION

At present, a magnet with high magnetic flux density is urgently needed in order to reduce the size of the motor or other electrical devices. In a bonded magnet, factors that determine the magnetic flux density are the magnetic performance (magnetization, in particular) of magnet powder and the content (compositional ratio) of the magnet powder in the bonded magnet. When the magnetization of the magnet powder itself is not so high, a desired magnetic flux density cannot be obtained unless the content of the magnet powder in the bonded magnet is raised to an extremely high level.

As mentioned in the above, MQP-B powder made by MQI Corp. which is now being used widely has an insufficient magnetic flux density. As a result, in the manufacture of the bonded magnets, one is compelled to raise the content of the magnet powder in the bonded magnets, that is, to make the magnets high density, which leads to the lack of reliability in the mechanical strength or the like, in addition to a poor magnetizability due to the high coercivity.

In contrast, the magnet powders according to this invention have, in the region of B values higher than those of the straight line Pc=2.0 in the second quadrant of the B-H diagram representing the magnetic characteristic at room temperature, magnetic characteristics such that the magnetic flux density is always on the upper side of the straight line represented by Equation (I), and the intrinsic coercive force (iHc) is in the range of 5.1 to 9.0 kOe. Consequently, the magnet powders have a sufficiently high magnetic flux density and an adequate coercivity, so that it is not necessary to raise the content of the magnet powders in the bonded magnets to such a high level. As a result, it is possible to provide highly reliable bonded magnets with high mechanical strength and excellent moldability, corrosion resistance, and magnetizability, thereby contributing significantly to reduction in the size of magnet mounted apparatuses, such as a motor, through miniaturization and high performance of the bonded magnets.

Moreover, the magnet powders according to this invention can be composed so as to form structures (nanocomposite structure in particular) in which hard magnetic phases and soft magnetic phases exist adjacent to each other with a separation on the order of several tens of nm.

The MQP-B powder made by MQI Corp. is a single phase structure of hard magnetic phase, but a nanocomposite structure has also a soft magnetic phase having a high magnetization. Accordingly, it has an advantage that the total magnetization of the system as a whole is high, and moreover, the recoil permeability gets high so that it has also an advantage that, even after the application of a reverse magnetic field once, the demagnetizing factor remains small.

Although among the conventional magnets having nanocomposite structure there are some magnets which have a high remanent magnetic flux density, their coercivity is low and their squareness is poor. Because of this, the magnetic flux density higher than that given by Equation (I) cannot be secured unless the permeance coefficient Pc is larger than about 5, so that use of the bonded magnets is very much limited.

[Alloy Composition of Magnet Powders]

The magnet powders according to this invention have alloy compositions represented by $R_x(Fe_{1-y}Co_y)_{100-x-z-w}B_zAl_w$ (R is at least one kind of rare-earth element, x is 8.1–9.4 at %, y is 0–0.30, z is 4.6–6.8 at %, and w is 0.02–0.8 at %).

Examples of rare-earth metals R include Y, La, Ce, Pr, Nd, Pm, Sm, Eu, Gd, Tb, Dy, Ho, Er, Tm, Yb, Lu, and a misch metal. In this connection, R may include one kind or two or more kinds of these elements.

The content of R is set at 8.1–9.4 at %. When the content of R is less than 8.1 at %, sufficient coercive force cannot be obtained, and addition of Al enhances the coercive force only to a small extent. On the other hand, when the content of R exceeds 9.4 at %, sufficient magnetic flux density fails to be obtained because of the drop in the magnetization potential.

Here, it is preferable that R includes the rare-earth elements Nd and/or Pr as the principal ingredient. The reason for this is that these rare-earth elements enhance the saturation magnetization of the hard magnetic phase which constitutes the nanocomposite structure, and are effective in realizing a satisfactory coercivity as a magnet.

Moreover, it is preferable that R includes Pr, and its ratio to the totality of R is 5–75%, and more preferably 20–60%. This is because when the ratio lies in this range, it is possible to improve the coercivity and the rectangularity by hardly causing a drop in the remanent magnetic flux density.

Furthermore, it is preferable that R includes Dy and its ratio to the totality of R is less than 10%. When the ratio lies in this range, the coercivity can be improved without causing marked drop in the remanent magnetic flux density, and an improvement of the temperature characteristic is also possible.

Cobalt (Co) is a transition metal element having properties similar to Fe. By substituting a part of Fe by Co through addition of Co, the Curie temperature is elevated and the temperature characteristic of the powder is improved. However, if the substitution ratio of Fe by Co exceeds 0.30, both of the coercive force and the magnetic flux density tend to fall off. The range of 0.05–0.20 of the substitution ratio of Fe by Co is more preferable since in this range not only the temperature characteristic but also the magnetic flux density itself of the powder are improved.

Boron (B) is an element important for obtaining high magnetic characteristics, and its content is set at 4.6–6.8 at %. When the content of B is less than 4.6 at %, the squareness of the B-H loop is deteriorated. On the other hand, when the content of B exceeds 6.8 at %, nonmagnetic phases increase and the magnetic flux density drops sharply.

Aluminum (Al) is an element advantageous for improving the coercive force, and the effect of improvement of the coercive force is conspicuous when its content lies in the range of 0.02–0.8 at %. In addition, the rectangularity and the magnetic energy product are improved in this range following the improvement in the coercive force, and the heat resistance and corrosion resistance become also satisfactory. When the content of R is less than 8.1 at %, these effects due to addition of Al is very small as mentioned above. Further, when the content of Al exceeds 0.8 at %, the drop in the magnetization is conspicuous. As described in the above, the feature of this invention can be found in the incorporation of a minute amount or trace amount of Al, and addition of Al in the amount exceeding 0.8 at % gives rather an inverse effect which is not the intent of this invention.

In addition, for the purpose of improving the magnetic characteristics, other elements such as Cu, Ga, Si, Ti, V, Ta, Zr, Nb, Mo, Hf, Ag, Zn, P, Ge or the like may be included as needed in the alloy constituting the magnet powder.

[Nanocomposite Structure]

Figure 2:
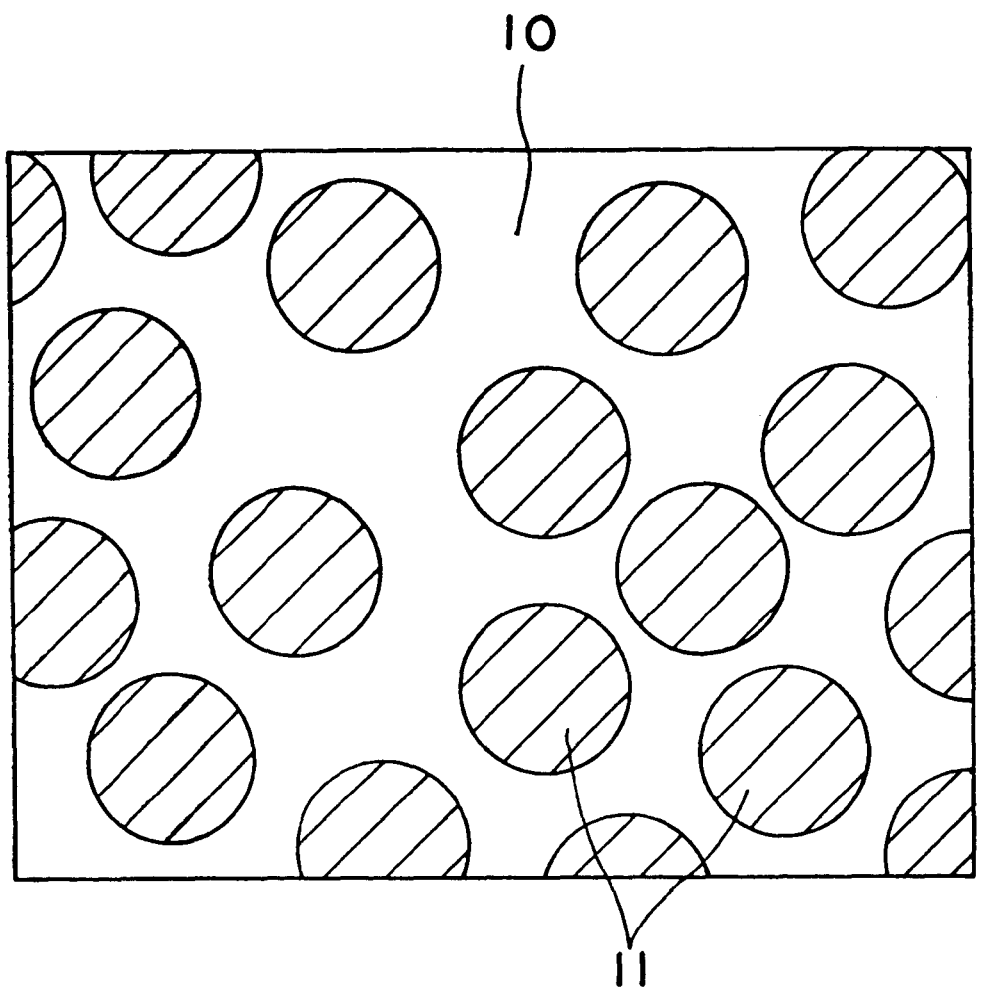
FIG. 2 is an illustration which schematically shows one example of a nanocomposite structure (macro structure) of a magnetic powder according to the present invention.
Figure 3:
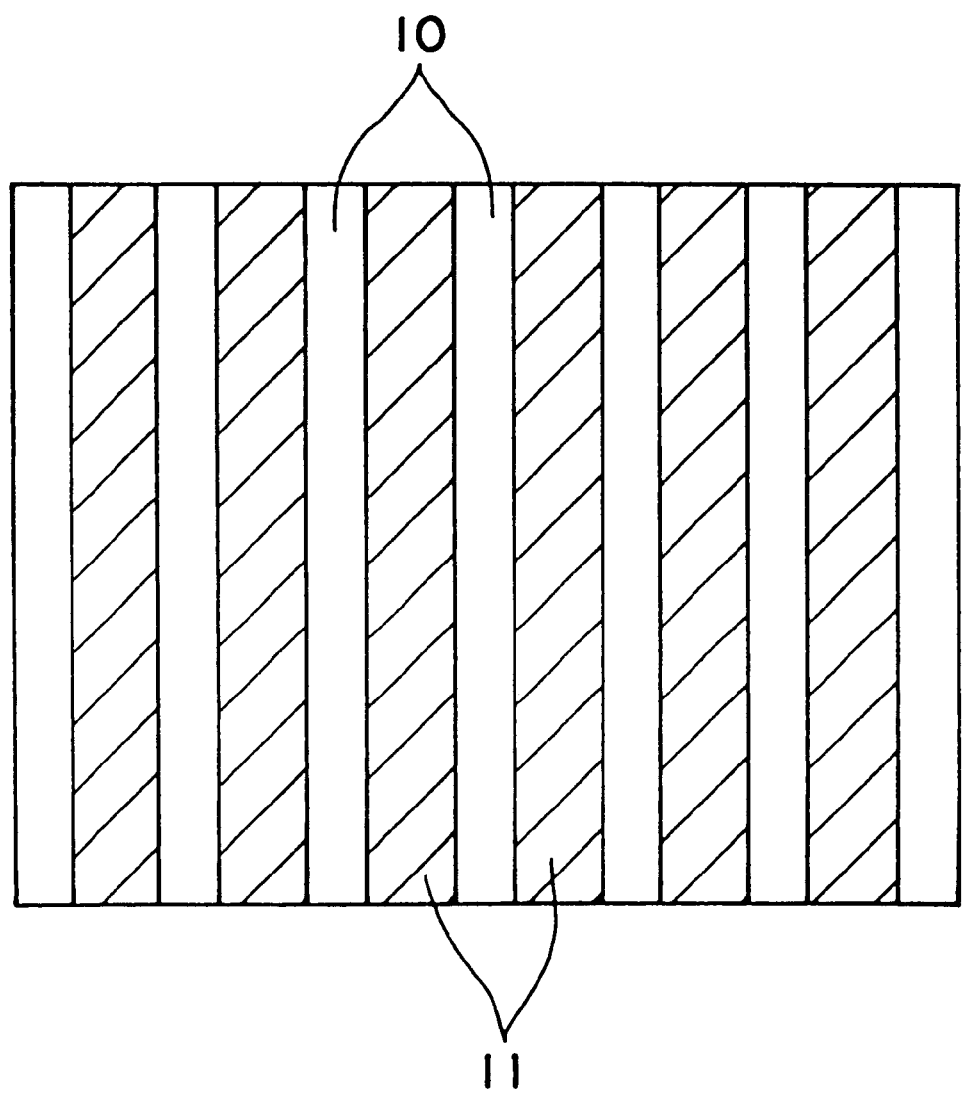
FIG. 3 is an illustration which schematically shows one example of a nanocomposite structure (macro structure) of a magnetic powder according to the present invention.

In a nanocomposite structure, a soft magnetic phase 10 and a hard magnetic phase 11 exist in a pattern (model) as shown in, for example, FIG. 1, FIG. 2 or FIG. 3, where the thickness or grain diameter of respective phases is on the order of nanometers (for example, 1–100 nm). The soft magnetic phase 10 and the hard magnetic phase 11 are arranged adjacently and perform magnetic exchange interaction. The patterns illustrated in FIG. 1 to FIG. 3 are only specific examples, and are not limited thereto. For example, a nanocomposite structure may have a pattern in which the soft magnetic phase 10 and the hard magnetic phase 11 in FIG. 2 are interchanged.

Since the magnetization of the soft magnetic phase readily changes its orientation by the action of an external magnetic field, when it coexists with the hard magnetic phase, the magnetization curve for the entire system shows a stepped "serpentine curve" in the second quadrant of the B-H diagram. However, when the soft magnetic phase has a sufficiently small size of less than several tens of nm, magnetization of the soft magnetic body is sufficiently strongly constrained through the coupling with the magnetization of the surrounding hard magnetic body, so that the entire system behaves like a hard magnetic body.

A magnet having such a nanocomposite structure has mainly the following five features.

(1) In the second quadrant of the B-H diagram, the magnetization springs back reversively (in this sense, such a magnet is also referred to as a "spring magnet").
(2) It has a satisfactory magnetizability, and it can be magnetized with a relatively low magnetic field.
(3) The temperature dependence of the magnetic characteristics are small as compared with the case where the system is constituted exclusively of a hard magnetic phase.
(4) The changes in the magnetic characteristics with the lapse of time are small.
(5) No deterioration in the magnetic characteristics is observable even if it is finely pulverized.

In the alloy composition described in the above, the hard magnetic phase and the soft magnetic phase are composed of, for example, respectively by the following.

The hard magnetic phase: $R_2TM_{14}B$ system (where, TM is Fe or Fe and Co), or $R_2TM_{14}BAl$ system.

The soft magnetic phase: TM (α-Fe or α-(Fe, Co) in particular), or an alloy of TM and Al.

[Manufacture of Magnet Powders]

As for the magnet powders according to this invention, it is preferable that they are manufactured by quenching a molten alloy, and more preferable that they are manufactured by pulverizing a quenched ribbon obtained by quenching and solidifying the molten metal of the alloy. An example of such a method will be described in the following.

Figure 4:
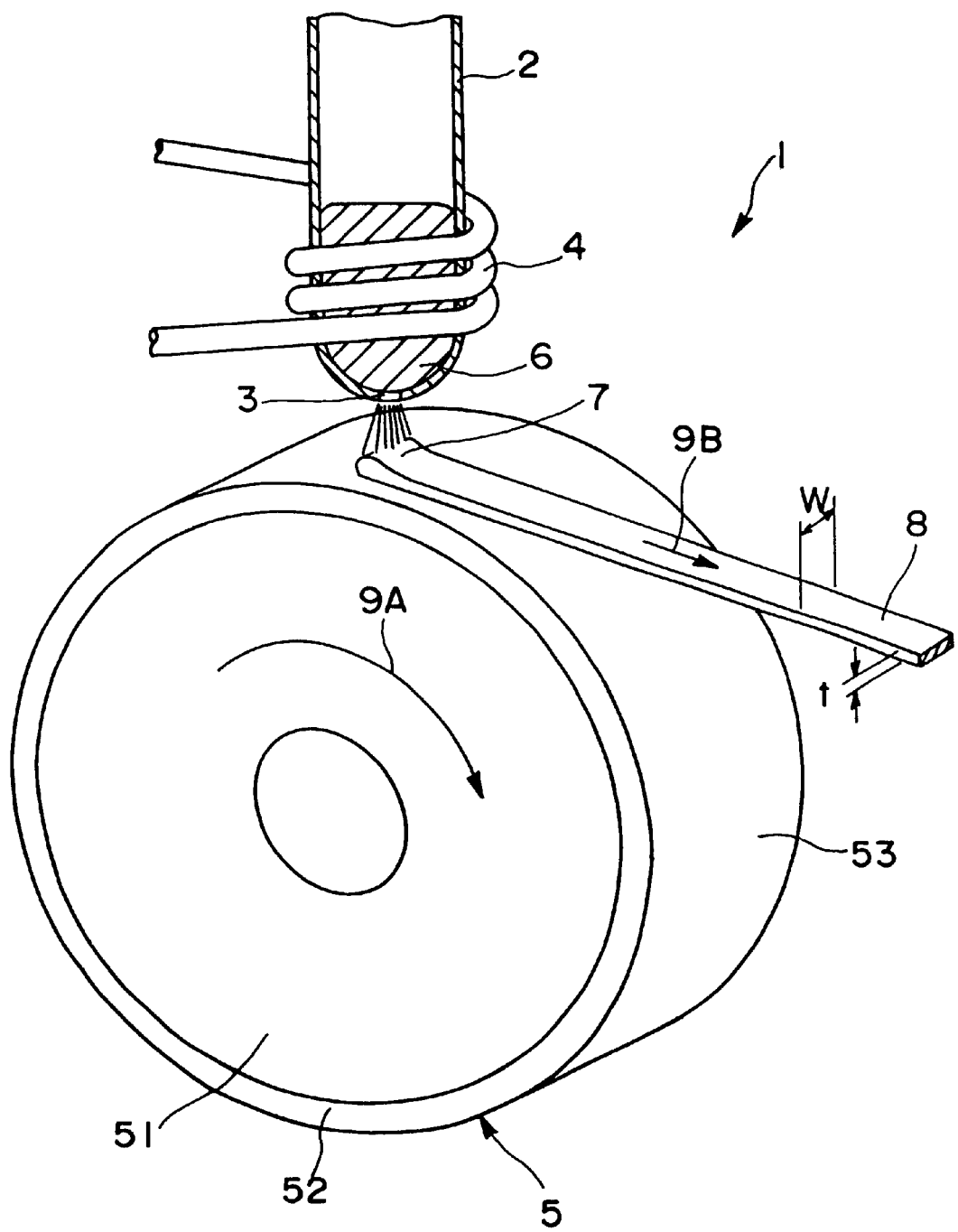
FIG. 4 is a perspective view showing an example of the configuration of an apparatus (quenched ribbon manufacturing apparatus) for manufacturing a magnet material.
Figure 5:
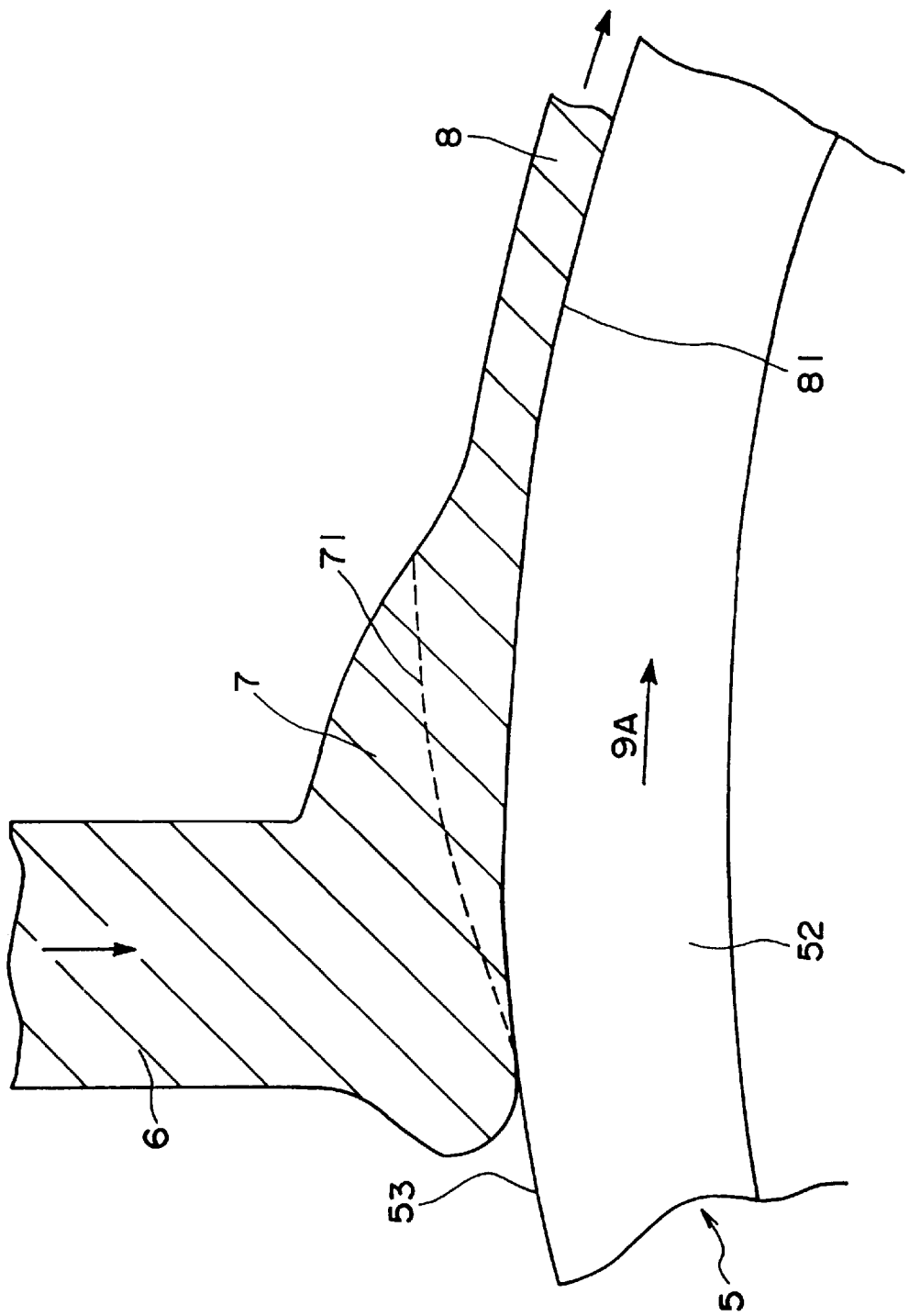
FIG. 5 is a sectional side view showing the situation in the vicinity of colliding section of the molten metal with a cooling roll in the apparatus shown in FIG. 4.

FIG. 4 is a perspective view showing an example of the configuration of an apparatus (quenched ribbon manufacturing apparatus) for manufacturing a magnet material by the quenching method using a single roll, and FIG. 5 is a sectional side view showing the situation in the vicinity of colliding section of the molten metal with a cooling roll in the apparatus shown in FIG. 4.

As shown in FIG. 4, a quenched ribbon manufacturing apparatus 1 is provided with a cylindrical body 2 capable of storing the magnet material, and a cooling roll 5 which rotates in the direction of an arrow 9A in the figure relative to the cylindrical body 2. A nozzle (orifice) 3 which injects the molten metal of the magnet material alloy is formed at the lower end of the cylindrical body 2.

In addition, a heating coil 4 is arranged on the outer periphery of the cylindrical body 2 in the vicinity of the nozzle 3, and the magnet material in the cylindrical body 2 is melted by inductively heating the interior of the cylindrical body 2 through application of, for example, a high frequency wave to the coil 4.

The cooling roll 5 is constructed from a base part 51 and a surface layer 52 which forms a circumferential surface 53 of the cooling roll 5.

The base part 51 may be formed either integrally with the surface layer 52 using the same material, or formed using a material different from that of the surface layer 52.

Although there is no particular limitation on the material of the base part 51, it is preferable that it is a metallic material with high heat conductivity such as copper or a copper alloy in order to be able to dissipate heat of the surface layer 52 as quickly as possible.

Further, it is preferable that the surface layer 52 is constituted of a material with heat conductivity equal to or lower than that of the base part 51.

The quenched ribbon manufacturing apparatus 1 is installed in a chamber (not shown), and is operated preferably under the condition where the interior of the chamber is filled with an inert or other kind of gas. In particular, in order to prevent oxidation of a quenched ribbon 8, it is preferable that the gas is an inert gas such as argon, helium, nitrogen or the like.

In the quenched ribbon manufacturing apparatus 1, the magnet material is placed in the cylindrical body 2 and melted by heating with the coil 4, and the molten metal 6 is discharged from the nozzle 3. Then, as shown in FIG. 5, the molten metal 6 collides with the circumferential surface 53 of the cooling roll 5, and after the formation of a paddle 7, is cooled down rapidly to be solidified while dragged along the circumferential surface 53 of the rotating cooling roll 5, thereby forming the quenched ribbon 8 continuously or intermittently. Roll surface 81 of the quenched ribbon 8 thus formed is soon parted from the circumferential surface 53, and proceeds in the direction of an arrow 9B in FIG. 4. The solidification interface 71 of the molten metal is indicated by a broken line in FIG. 5.

The optimum range of the circumferential velocity of the cooling roll 5 depends upon the composition of the molten alloy, the wettability of the circumferential surface 53 with respect to the molten metal 6, and the like. However, for the enhancement of the magnetic characteristics, a velocity in the range of 1 to 60 m/s is normally preferable, and 5 to 40 m/s is more preferable. If the circumferential velocity of the cooling roll 5 is too small, the thickness t of the quenched ribbon 8 is too large depending upon the volume flow rate (volume of the molten metal discharged per unit time), and the diameter of the crystalline grains tends to increase. On the contrary, if the circumferential velocity is too large, amorphous structure becomes dominant. Further, enhancement of the magnetic characteristics can be expected in neither case even if a heat treatment is given in the later stage.

Thus obtained quenched ribbon 8 may be subjected to a heat treatment for the purpose of, for example, acceleration of recrystallization of the amorphous structure and homogenization of the structure. The conditions of this heat treatment may be, for example, a heating in the range of 400 to 900° C. for 0.5 to 300 min.

Moreover, in order to prevent oxidation, this heat treatment is preferable to be performed in a vacuum or under a reduced pressure (for example, in the range of $1 \times 10^{-1}$ to $1 \times 10^{-6}$ Torr), or in a nonoxidizing atmosphere of an inert gas such as nitrogen, argon, helium or the like.

The quenched ribbon (thin ribbon-like magnet material) 8 obtained as in the above has a microcrystalline structure or a structure in which microcrystals are included in an amorphous structure, and displays excellent magnetic characteristics. The magnet powder of this invention is obtained by pulverizing the quenched ribbon 8.

The pulverizing method of the quenched ribbon is not particularly limited, and various kinds of pulverizing or crushing apparatus such as ball mill, vibration mill, jet mill, and pin mill may be employed. In this case, in order to prevent oxidation, pulverization may be performed under vacuum or reduced pressure (for example, under a low pressure of $1 \times 10^{-1}$ to $1 \times 10^{-6}$ Torr), or in a nonoxidizing atmosphere of an inert gas such as nitrogen, argon, helium, or the like.

The average grain size of the magnet powder is not particularly limited. However, for powders intended for the manufacture of isotropic rare-earth bonded magnets described later, by considering prevention of oxidation of the magnet powder and of deterioration in the magnetic characteristics due to pulverization, it is preferable to choose the range of 0.5 to 150 μm, more preferably the range of 0.5 to 80 μm, and still more preferably the range of 1 to 50 μm.

In order to obtain a better moldability of the bonded magnet, it is preferable to give a certain degree of dispersion to the grain size distribution of the magnet powder. By so doing, it is possible to reduce the porosity of the bonded magnet obtained. As a result, it is possible to raise the density and the mechanical strength of the bonded magnet assuming the same content of the magnet powder in the bonded magnet, thereby further improving the magnetic characteristics.

The obtained magnet powder may be subjected to a heat treatment for the purpose of, for example, removing the effect of stress introduced by the pulverization and controlling the grain size of the crystals. The conditions of the heat treatment are, for example, heating at a temperature in the range of 350 to 850° C. for 0.5 to 300 min.

In order to prevent oxidation of the powder, it is preferable to perform the heat treatment in a vacuum or under a reduced pressure (for example, in the range of $1 \times 10^{-1}$ to $1 \times 10^{-6}$ Torr), or in a nonoxidizing atmosphere of an inert gas such as nitrogen, argon, and helium.

When a bonded magnet is manufactured using the magnet powder described in the above, the magnet powder has a satisfactory bindability with the binding resin (wettability of the binding resin), so that the bonded magnet has a high mechanical strength and excellent thermal stability (heat resistance) and corrosion resistance. Consequently, it can be concluded that the magnet powder is suitable for the manufacture of the bonded magnet.

In the above, the quenching method is described in terms of the single roll method, but the twin roll method may also be employed. Besides, other methods such as the atomizing method which uses gas atomization, the rotating disk method, the melt extraction method, and the mechanical alloying method (MA) may also be employed. Since such a quenching method can refine the metallic structure (crystal grains), it is effective for enhancing the magnet characteristics, especially the coercivity or the like, of the bonded magnet.

[Bonded Magnets and Their Manufacture]

Next, the isotropic rare-earth bonded magnets (hereinafter, referred to simply also as "bonded magnets") according to this invention will be described.

The bonded magnets of this invention is formed by binding the above described magnet powder using a binding resin.

As the binder either of a thermoplastic resin or a thermosetting resin may be employed.

As the thermoplastic resin, for example, a polyamid (example: nylon 6, nylon 46, nylon 66, nylon 610, nylon 612, nylon 11, nylon 12, nylon 6-12, and nylon 6-66); a thermoplastic polyimide; a liquid crystal polymer such as an aromatic polyester; a poly phenylene oxide; a poly phenylene sulfide; a polyolefin such as a polyethylene, a polypropylene and an ethylene-vinyl acetate copolymer; a modified polyolefin; a polycarbonate; a poly methyl methacrylate; a polyester such as a poly ethylen terephthalate and a poly butylene terephthalate; a polyether; a polyether ether ketone; a polyetherimide; a polyacetal, or the like; and a copolymer, a blended body, and a polymer alloy having these as main ingredients, or the like, may be mentioned, where one kind or a mixture of two or more kinds of these may be employed.

Among these resins, a resin containing a polyamide as its main ingredient is particularly preferred from the viewpoint of especially excellent moldability and high mechanical strength, and a resin containing a liquid crystal polymer and/or a poly phenylene sulfide as its main ingredient is also preferred from the viewpoint of enhancing the heat resistance. These thermoplastic resins also have an excellent kneadability with the magnet powder.

These thermoplastic resins provide an advantage in that a wide range of selection can be made. For example, it is possible to provide a thermoplastic resin having a good moldability or to provide a thermoplastic resin having good heat resistance and mechanical strength by appropriately selecting their kinds, copolymerization or the like.

On the other hand, as the thermosetting resin, various kinds of epoxy resins of bisphenol type, novolak type, and naphthalene-based, a phenolic resin, a urea resin, a melamine resin, a polyester (or an unsaturated polyester) resin, a polyimide resin, a silicone resin, a polyurethane resin, or the like, for example, may be mentioned, and one kind or a mixture of two or more kinds of these may be employed.

Among these resins, an epoxy resin, a phenolic resin, a polyimide resin, or a silicone resin is preferable from the viewpoint of their special excellence in the moldability, high mechanical strength, and high heat resistance, and an epoxy resin is especially preferable. These thermosetting resins also have an excellent kneadability with the magnet powder and homogeneity in kneading.

The unhardened thermosetting resin to be used may be either in liquid state or in solid (powdery) state at room temperature.

A bonded magnet according to this invention described in the above may be manufactured, for example, as in the following. First, a bonded magnet composite (compound) which contains the magnet powder, a binder resin, and an additive (antioxidant, lubricant, or the like) as needed, is prepared. Then, the prepared compound is formed into a desired magnet form in a space free from magnetic field by a molding method such as compression molding (press molding), extrusion molding, or injection molding. When the binding resin used is a thermosetting type, the green compact obtained is hardened by heating or the like after molding.

In the three kinds of molding method, the extrusion molding and the injection molding (in particular, the injection molding) have advantages in that the latitude of shape selection is broad, the productivity is high, and the like. However, these molding methods require to ensure a sufficiently high fluidity of the compound in the molding machine in order to obtain satisfactory moldability. For this reason, in these methods it is not possible to increase the content of the magnet powder, namely, to make the bonded magnet having high density, as compared with the case of the compression molding method. In this invention, however, it is possible to obtain a high magnetic flux density as will be described later, so that excellent magnetic characteristics can be obtained even without making the bonded magnet high density. This advantage of the present invention can also be extended even in the case where bonded magnets are manufactured by the extrusion molding method or the injection molding method.

The content of the magnet powder in the bonded magnet is not particularly limited, and it is normally determined by considering the compatibility of the molding method and moldability, and high magnetic characteristics. More specifically, it is preferable to be in the range of 75–99 wt %, and more preferably in the range of 85–97.5 wt %.

In particular, for a bonded magnet to be manufactured by the compression molding method, the content of the magnet powder is preferable to be in the range of 90–99 wt %, and more preferably in the range of 93–98.5 wt %.

For a bonded magnet to be manufactured by the extrusion molding or the injection molding, the content of the magnet powder is preferable to be in the range of 75–98 wt %, and more preferably in the range of 85–97 wt %.

The density $\rho$ of the bonded magnet is determined by factors such as the specific gravity of the magnet powder contained in the magnet and the content of the magnetic powder, and porosity of the bonded magnet and the like. In the bonded magnets according to this invention, the density $\rho$ is not particularly limited, but it is preferable to be in the range of 5.3–6.6 g/cm$^3$, and more preferably in the range of 5.5–6.4 g/cm$^3$.

In this invention, since the magnetic flux density and the coercive force of the magnet powder are high, the molded bonded magnet provides excellent magnetic characteristics (especially, high magnetic energy product and high coercive force) even when the content of the magnet powder is relatively low. In this regard, it goes without saying that it is possible to obtain the excellent magnetic characteristics in the case where the content of the magnet powder is high.

The shape, dimensions, and the like of the bonded magnet manufactured according to this invention are not particularly limited. For example, as to the shape, all shapes such as columnar, prism-like, cylindrical (ring-shaped), circular, plate-like, curved plate-like, and the like are acceptable. As to the dimensions, all sizes starting from large-sized one to ultraminuaturized one are acceptable. However, as repeatedly described in this specification, the present invention is particularly advantageous in miniaturization and ultraminiaturization of the bonded magnet.

The bonded magnet of this invention as described in the above has magnetic characteristics that its magnetic flux density is always in the upper side (in the hatched region in FIG. 6) of the straight line represented by the following Equation (I) in the higher B region than the straight line Pc (permeance coefficient)=2.0 in the second quadrant of the B-H diagram that represents the magnetic characteristics at room temperature, and its coercive force (iHc) is in the range of 5.1–9.0 kOe.

$$B=1.25\times\rho+1.25\times H \quad \text{Equation (I)}$$

(where B is the magnetic flux density [kG], $\rho$ is the density [g/cm$^3$] of the bonded magnet, and H is the magnetic field [kOe].) As seen from FIG. 6, H becomes negative value in the second quadrant.

The reason for this will be described in the following.

[Equation (I)]

In the conventional isotropic bonded magnets, like the bonded magnets manufactured by using the MQP-B powder, it is difficult to obtain the magnetic flux density higher than that shown by Equation (I) in the region Pc>2.0, so it is not possible to further miniaturize the motor or the like.

Moreover, if a bonded magnet with the magnetic flux density on the higher B side of Equation (I) can be obtained, it is possible to obtain high magnetic characteristics without increasing the content of the magnet powder to elevate the density $\rho$ of the bonded magnet, namely, without degrading the moldability, corrosion resistance, thermal resistance, and mechanical strength.

Here, the reason for specifying the region higher than Pc=2.0 is that this region can cover almost all situations of practical uses of motors or the like.

[Intrinsic Coercive Force]

The intrinsic coercive force (iHc) of the bonded magnet is preferable to be in the range of 5.1–9.0 kOe, and more preferably in the range of 5.5–8.5 kOe.

If the intrinsic coercive force exceeds the upper limit, the magnetizability is deteriorated. Further, if it is less than the lower limit, demagnetization occurs conspicuously when a reverse magnetic field is applied depending upon the usage of the motor, and the thermal resistance at high temperatures is deteriorated. Consequently, by restricting the intrinsic coercive force to the above stated range, in the case where the bonded magnet (cylindrical magnet in particular) is subjected to multipolar magnetization, a satisfactory magnetization can be accomplished even when a sufficiently high magnetizing field cannot be secured, which makes it possible to obtain a sufficient magnetic flux density, and to provide a high performance bonded magnet, especially a bonded magnet for motor.

The magnetic energy product (BH)max of the bonded magnet according to this invention is not particularly limited, but it is preferable to be in the range of 7–15 MGOe, and more preferably in the range of 12–15 MGOe.

EXAMPLES

Example 1

A magnet powder with alloy composition $Nd_{8.9}Fe_{bal}Co_8B_{5.5}Al_{0.2}$ (hereinafter, referred to as "composition A") was obtained by the method described below.

First, each of the materials Nd, Fe, Co, B, and Al was weighed to cast a mother alloy ingot, and a sample of about 15 g was cut out from the ingot.

A quenched ribbon manufacturing apparatus 1 as shown in FIG. 4 and FIG. 5 was prepared, and the sample was placed in a quartz tube 2 having a nozzle (circular orifice) 3 at the bottom. After evacuating the interior of a chamber in which the quenched ribbon manufacturing apparatus 1 is housed, an inert gas (Ar gas) was introduced to obtain an atmosphere with desired temperature and pressure.

Then, the ingot sample in the quartz tube 2 was melted by high frequency induction heating, the circumferential velocity and the jetting pressure (difference between the inner pressure of the quartz tube 2 and the pressure of the atmosphere) were adjusted to 20 m/s and 40 kPa, respectively. Under the state, the molten metal was jetted against the circumferential surface 53 of the cooling roll 5, to obtain a quenched ribbon (average thickness of about 30 $\mu$m, and average width of about 2 mm).

The quenched ribbon was then coarsely crushed, and the powder was subjected to a heat treatment in an argon atmosphere at 700° C. for 300 sec to obtain the magnet powder of composition A.

To analyze the phase structure, the magnet powder obtained was subjected to X-ray diffraction using Cu-K$\alpha$ line at the diffraction angle of 20°–60°. From the thus obtained diffraction pattern, the presence of diffracted peaks of a hard magnetic phase, $Nd_2(Fe.Co)_{14}B_1$ phase, and a soft magnetic phase, $\alpha$-(Fe,Co) phase, were confirmed. Further, from the observation result using a transmission electron microscope (TEM), the formation of a nanocomposite structure was confirmed.

In addition, the magnetic characteristics of the obtained magnet powder were measured by vibrating sample magnetometer (VSM). The result is shown in the following Table 1. In this connection, it is to be noted that no demagnetizing field correction was given to the measurement result.

TABLE 1

|  | $\sigma r$(emu/g) | iHc(kOe) |
| --- | --- | --- |
| Composition A | 110.5 | 6.2 |

Next, for grain size adjustment, the magnet powder was ground further by a granulator in an argon atmosphere to obtain magnet powder with average grain size of 30 $\mu$m.

A compound for bonded magnet was prepared by mixing and kneading the magnet powder, an epoxy resin and a small amount of hydrazine antioxidant.

Then, the compound was crushed to be granular, the granular substance was weighed and filled into a die of a press machine, and a molded body was obtained by compression molding (in the absence of a magnetic field) the sample at a pressure of 6 t/cm$^2$.

After releasing from the die, the epoxy resin was cured by heating, and a columnar isotropic bonded magnet with diameter 10 mm$\phi$ and height 8 mm was obtained.

The content of the magnet powder in the bonded magnet was 97.0 wt %. This bonded magnet will be referred to as Example 1 of this invention.

In addition, using commercially available MQP-B powder made by MQI Corp., an isotropic bonded magnet was manufactured by the same conditions and method as in Example 1, which will be referred to as Comparative Example 1.

The density of these two bonded magnets was 6.10 g/cm³. After subjecting both bonded magnets to pulse magnetization (with maximum applied magnetic field of 40 kOe) in advance, their magnetic characteristics were measured at temperature 23° C. (room temperature) using a DC self-recording magnetic flux meter with maximum applied magnetic field of 25 kOe. The result is shown in Table 2 below.

TABLE 2

|  | Br (kG) | iHc (kOe) | (BH)max (MGOe) |
|---|---|---|---|
| Example 1 | 8.5 | 6.2 | 12.7 |
| Comparative Example 1 | 7.2 | 10.0 | 11.0 |

Figure 6:
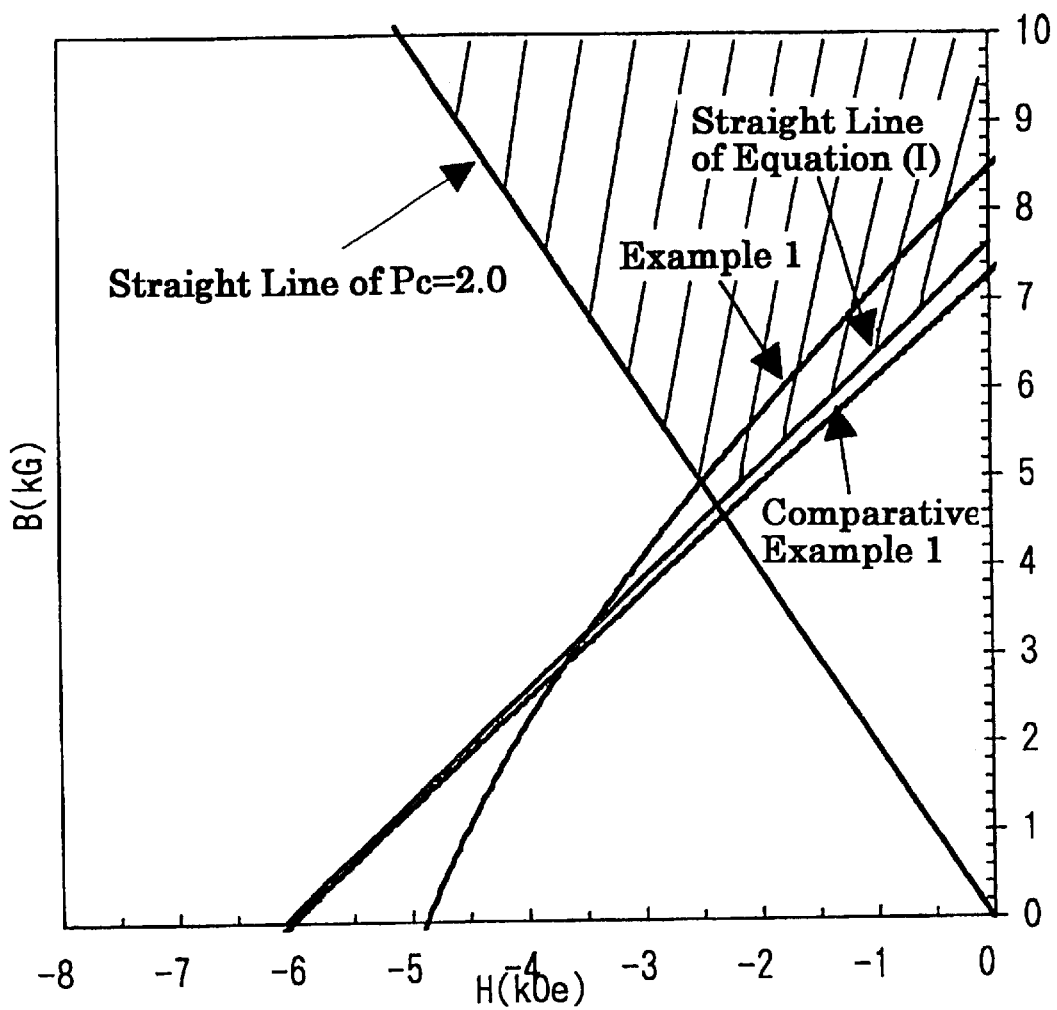
FIG. 6 is a B-H diagram that represents demagnetization curves.

The B-H diagrams representing the demagnetization curves for both the bonded magnets are shown in FIG. 6. Since the density ρ of the bonded magnet is 6.10 g/cm³ for both, Equation (I) becomes B=7.63+1.25H.

Both of straight lines for this equation and Pc=2.0 are also shown in FIG. 6.

As can be seen from FIG. 6, Example 1 has higher magnetic flux density than Comparative Example 1 (in the region above Pc=2.0) in spite of the identical density for both.

Moreover, the magnetic flux density of Example 1 always has higher value than that given by Equation (I) in the region Pc>2.0. Hence, by actually using bonded magnet of Example 1 to motors or the like, it becomes possible to miniaturize the equipment substantially while maintaining the equivalent performance.

Figure 7:
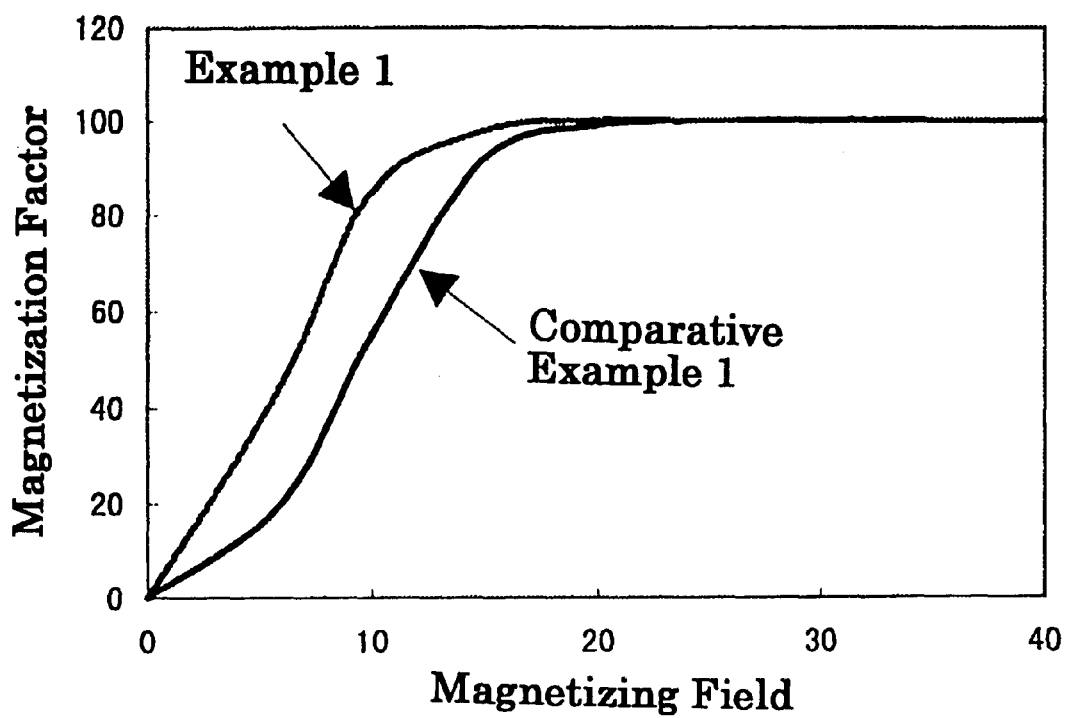
FIG. 7 is a graph which shows the magnetizability (the relationship between the intensity of the magnetizing field and the magnetization factor).

Next, the relationship between the intensity of the magnetizing field and the magnetization factor was examined for Example 1 and Comparative example 1, and the result is shown in FIG. 7. The magnetization factor is defined as the ratio of the magnetic flux density to its value at 60 kOe of the magnetizing field as 100%.

As is clear from FIG. 7, Example 1 has a superior magnetizability compared with Comparative Example 1, that is, a higher magnetic flux density can be obtained for a lower magnetizing field.

Next, by filling the same compound as for Example 1 in a die having a ring-shaped cavity, a compact was formed by compression molding (in the absence of a magnetic field) with a pressure of 7 t/cm².

After release from the die, by thermally curing the epoxy resin, a cylindrical (ring-shaped) isotropic magnet with outer diameter 22 mmφ, inner diameter 20 mmφ and height 4 mmφ was obtained. The content of the magnet powder in the bonded magnet was 97.5 wt % and its density ρ was 6.24 g/cm³. This bonded magnet will be referred to as Example 2.

Furthermore, using the compound for the bonded magnet which is the same as for Comparative Example 1, a cylindrical (ring-shaped) isotropic bonded magnet was manufactured under the conditions and with the size that are the same as those for Example 2. The content of the magnet powder in the bonded magnet was 97.6 wt % and its density ρ was 6.25 g/cm³. This bonded magnet will be referred to as Comparative Example 2.

The isotropic bonded magnets Example 2 and Comparative Example 2 thus obtained were subjected respectively to octopolar magnetization using magnetizing current of 16 kA. Spindle motors for CD-ROM were assembled separately using respective bonded magnets thus magnetized as rotor magnets thereof.

The voltage of the counter electromotive force generated in the wound coil of each spindle motor for CD-ROM was measured when the spindle motor was rotated at 1,000 rpm. The result showed that the voltage of the motor using the bonded magnet of Example 2 was 0.98V against 0.80V for the motor using the bonded magnet of Comparative Example 2, indicating an increase of about 20%.

Furthermore, the dimensional accuracy of the bonded magnet of Example 2 was high, with small (within ±0.05%) dimensional errors for all of the inner diameter, outer diameter, and height of the bonded magnet.

Example 2

Several kinds of bonded magnets with different density ρ were manufactured using the same magnet powder and the bonding resin as those for Example 1 except for varying the pressure at compression molding. These bonded magnets will be referred to collectively as Example 3.

In addition, several kinds of bonded magnets with different density ρ were manufactured using the same magnet powder (MQP-B powder) and the binding resin as those for Comparative Example 1 under the same conditions except for varying the pressure at compression molding. These bonded magnets will be referred to collectively as Comparative Example 3.

The density ρ for various molding pressures was examined for both of these bonded magnets, and the result is shown in Table 3 below.

TABLE 3

| Molding Pressure (t/cm²) | 4 | 6 | 9 | 20 | 30 | 45 |
|---|---|---|---|---|---|---|
| Example 3 (g/cm³) | 5.90 | 6.13 | 6.35 | 6.55 | 6.60 | 6.65 |
| Comp. Example 3 (g/cm³) | 5.89 | 6.14 | 6.35 | 6.53 | 6.60 | 6.67 |

As can be seen from Table 3, the correlation between the molding pressure and the density is almost equivalent for Example 3 and Comparative Example 3, with a tendency of porosity drop and density increase with the increase in the molding pressure.

When the density ρ exceeds 6.6 g/cm³, the bonded magnets obtained became brittle to generate cracks, so satisfactory molding was practically difficult for both the bonded magnets.

As mentioned in connection with Example 1, a higher magnetic flux density can be obtained by the bonded magnet of Example 3 than the bonded magnet of Comparative Example 3 assuming that the densities of both the bonded magnets are equal. In other words, the same magnetic flux density can be obtained using the bonded magnet of Example 3 with a lower density or a smaller volume. That a lower density suffices means that the moldability can be improved and the dimensional accuracy can be enhanced accordingly, which means that bonded magnets with high strength and enhanced reliability with less defects such as cracks can be obtained. Further, that a smaller volume suffices means that the latitude for the shape and dimensions in design can be enhanced, which contributes to miniaturization of the motor or the like in which a bonded magnet it to be used.

Moreover, corrosion resistance was tested at 60° C. for 500 hours in a thermo-hydrostat of relative humidity 95% for the bonded magnets with densities 6.35 and 6.60 g/cm³ out of Example 3 and Comparative Example 3. The corrosion resistance was evaluated by visual discrimination of presence or absence of rust on the surface of the bonded magnets.

For both Example 3 and Comparative Example 3, occurrence of rust was not observable in the magnets with density 6.35 g/cm$^3$, but it was observed in the magnets with density 6.60 g/cm$^3$. From this, it was confirmed that the corrosion resistance is deteriorated when the density of the bonded magnet is raised.

Consequently, even if a high density bonded magnet is manufactured using the conventional magnet powder with inferior magnetic characteristics, not only sufficiently high magnetic flux density can not be obtained, but also the formed magnet tends to generate rust and have a low reliability.

In contrast, in the bonded magnets according to this invention, a high magnetic flux density can be obtained and bonded magnets with high performance and high reliability can be provided even if the density is not made so high, that is, even for a moderate density which can maintain satisfactory corrosion resistance.

(Embodiment 3)

A quenched ribbon with alloy composition $Nd_{8.9}Fe_{86.25-x}Co_8B_{5.7}Al_x$ was manufactured by the same method as that for Embodiment 1, and the ribbon was subjected to a heat treatment at 700° C. for 10 min in an Ar atmosphere. By means of the same analytical method as that described above, it was confirmed that the composition of the quenched ribbon has a nanocomposite structure.

Next, from the quenched ribbon, magnet powder was obtained by the same method as for Embodiment 1, and isotropic bonded magnets were manufactured using the magnet powder. By adjusting the molding pressure, the density of all the bonded magnets was made to have the same value of 6.20 g/cm$^3$.

In manufacturing the quenched ribbons, the Al content (x) was varied. The relationship between the Al content (x) in the magnet powder and the magnetic characteristics of the obtained bonded magnets is shown in Table 4 below.

TABLE 4

Relationship between Al Content and Magnetic Characteristics

| X (at %) | Br (kG) | iHc (kOe) | (BH)max (MGOe) |
|---|---|---|---|
| 0 | 8.4 | 4.3 | 9.7 |
| 0.02 | 8.8 | 5.5 | 12.4 |
| 0.05 | 9.0 | 6.5 | 13.9 |
| 0.2 | 8.8 | 6.3 | 13.4 |
| 0.8 | 8.6 | 5.8 | 12.1 |
| 1 | 8.2 | 5.0 | 10.9 |
| 1.5 | 7.9 | 4.5 | 8.8 |

As can be seen from Table 4, the effect of improvement in the coercive force could be observed in the range 0.2–0.8 at % of the Al content (x). When the Al content (x) exceeds 0.8 at %, the drop of Br and the squareness (SQ) is conspicuous so that sufficient magnetic energy product cannot be obtained.

Figure 8:
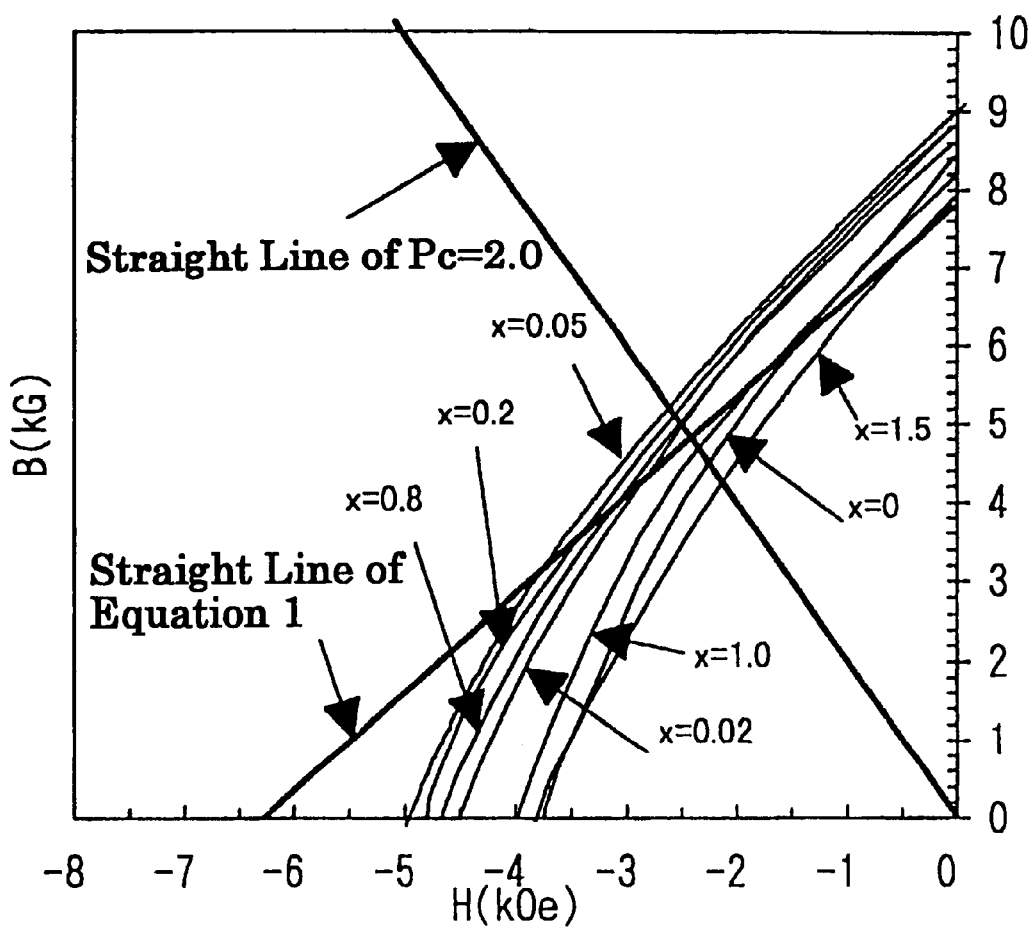
FIG. 8 is a B-H diagram that represents demagnetization curves.

The B-H diagrams representing the demagnetization curves of the respective bonded magnets are shown in FIG. 8. As is clear from FIG. 8, magnetic flux densities that are always higher than that represented by Equation (I) can be obtained in the range 0.2–0.8 of the Al content (x).

(Embodiment 4)

A quenched ribbon with alloy composition $(Nd_{1-y}Pr_y)_{9.0}Fe_{86.25}Co_8B_{5.7}Al0.2$ was manufactured by the same method as in Embodiment 1, and the ribbon was subjected to a heat treatment in an Ar atmosphere at 650° C. for 10 min. By the same analytical method as in the above, it was confirmed that the quenched ribbon has a nanocomposite structure.

From the quenched ribbon, magnet powder was obtained by the same method as for Embodiment 1, and isotropic bonded magnets were manufactured using the magnet powder. By adjusting the molding pressure, the density of all bonded magnets was made to have the same value of 6.35 g/cm$^3$.

In manufacturing the quenched ribbon, the substitution amount (y) by Pr was varied. The relationship between the Pr substitution amount (y) in the magnet powder and the magnetic characteristics of the bonded magnets obtained is shown in FIG. 9.

Figure 9:
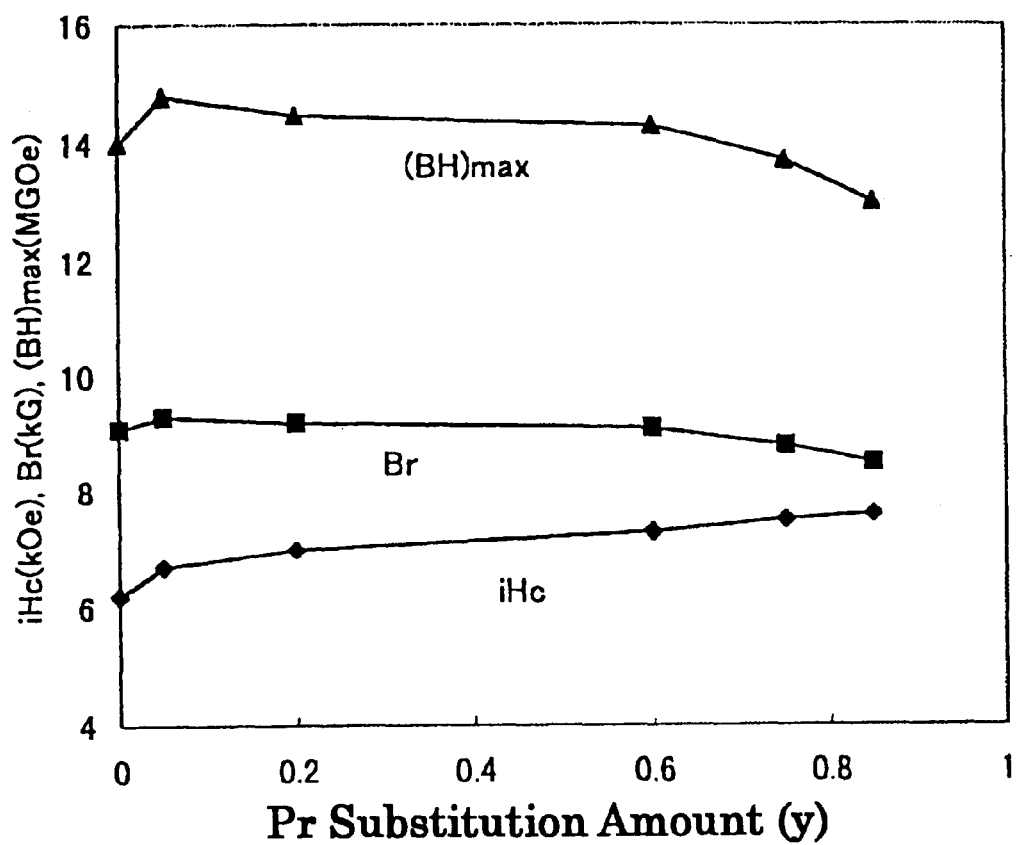
FIG. 9 is a graph which shows the relationship between the Pr substitution amount and the magnetic characteristics.

As can be seen from FIG. 9, an enhancement of the coercive force was observable by the substitution of a part of Nd by Pr.

(Embodiment 5)

A quenched ribbon with alloy composition $((Nd_{0.5}Pr_{0.5})_zDy_{1-z})_{9.0}Fe_{86.25}Co_8B_{5.7}Al_{0.2}$ was manufactured by the same method as for Embodiment 1, and the ribbon was subjected to a heat treatment in an Ar atmosphere at 680° C. for 15 min. From the same analytical method as in the above, it was confirmed that the quenched ribbon has a nanocomposite structure.

Magnet powder was obtained from the quenched ribbon by the same way as in Embodiment 1, and bonded magnets were manufactured using the magnet powder. By adjusting the molding pressure, the density of all bonded magnets was made to have the same value of 6.15 g/cm$^3$.

In manufacturing the quenched ribbon, the Dy substitution amount (1–z) was varied. The B-H diagrams representing the demagnetization curves of bonded magnets with different Dy contents are shown in FIG. 10.

Figure 10:
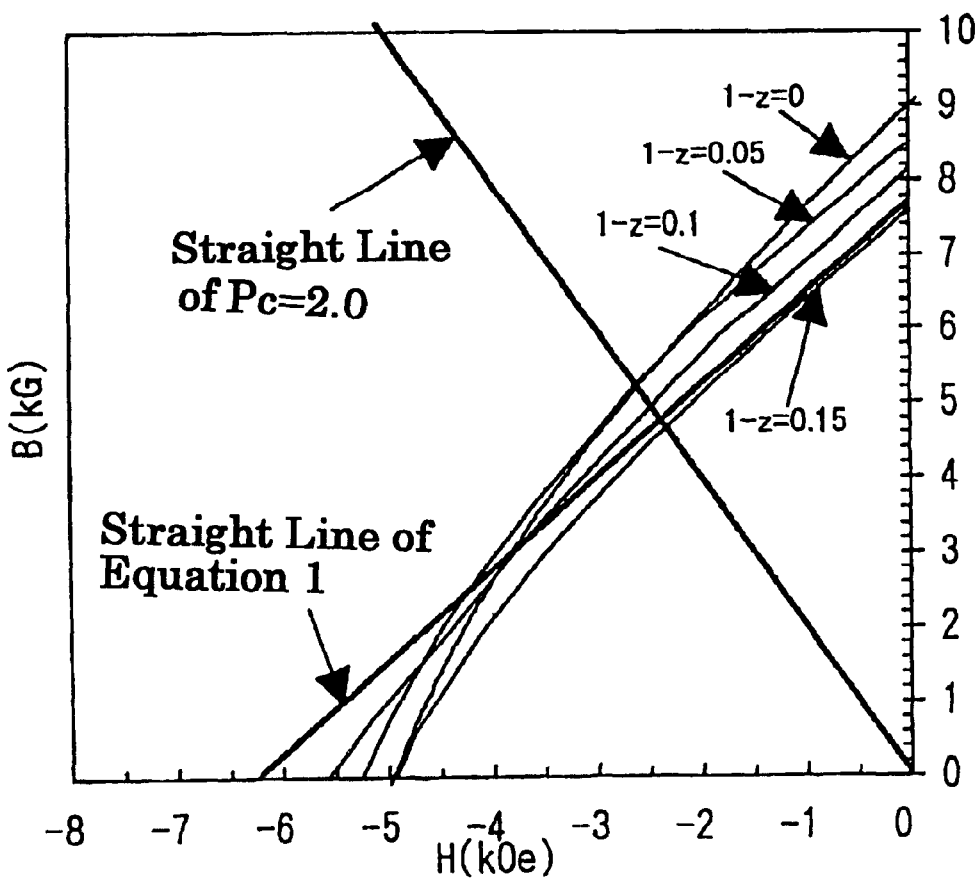
FIG. 10 is a B-H diagram that represents demagnetization curves.

As can be seen from FIG. 10, it was confirmed that the coercive force is enhanced by the addition of Dy, and especially that an adequate improvement of the coercive force could be achieved by the substitution amount of Dy of less than 0.1 (10% of the total amount of R).

Performance evaluation of bonded magnets manufactured by the same methods as for Embodiments 1–5 except that the bonded magnets were manufactured by extrusion molding showed results that are similar to those described in the above.

Moreover, performance evaluation of bonded magnets manufactured by the same methods as for Embodiments 1–5 except that the bonded magnets were manufactured by injection molding showed results similar to those described in the above.

As has been described in the above, the present invention has the following effects.

Because of the high magnetic flux density that can be secured by this invention, it is possible to obtain a bonded magnet with high magnetic performance even if it is isotropic. In particular, since magnetic performance equivalent to or better than the conventional isotropic bonded magnet can be obtained with a magnet of smaller volume as compared with the conventional isotropic bonded magnet, it is possible to provide a high performance motor of a smaller size.

Moreover, since a higher magnetic flux density can be secured, in manufacturing a bonded magnet sufficiently high magnetic performance is obtainable without pursuing a means for elevating the density of the bonded magnet. As a result, enhancement of the dimensional accuracy, mechanical strength, corrosion resistance, thermal resistance and the like can be attained along with the improvement in the moldability, so that it is possible to readily manufacture a bonded magnet with high reliability.

Since the magnetizability of the magnet according to this invention is excellent, it is possible to magnetize a magnet with a lower magnetizing field. In particular, multipolar magnetization or the like can be accomplished easily and surely, and further a high magnetic flux density can be obtained.

Since a high density is not required to the bonded magnet, the present invention is adapted to the manufacture of the bonded magnet by the extrusion molding method or the injection molding method by which molding at high density is difficult as compared with the compression molding method, and the effects described in the above can also be realized in the bonded magnet manufactured by these molding methods. Accordingly, the latitude of selection of the molding method and the shape for the bonded magnet can be expanded.

Finally, it is to be understood that the present invention is not limited to Examples described above, and many changes or additions may be made without departing from the scope of the invention which is determined by the following claims.

What is claimed is:

1. In a magnet powder having an alloy composition represented by $R_x(Fe_{1-y}Co_y)_{100-x-z-w}B_zAl_w$ (where R is at least one rare-earth element, x is 8.1–9.4 at %, y is 0–0.30, z is 4.6–6.8 at %, and w is 0.02–0.8 at %), and a structure in which a soft magnetic phase and a hard magnetic phase exist adjacent with each other;

the soft magnetic phase and the hard magnetic phase have a mean crystal grain size of 1–100 nm;

wherein the magnet powder has characteristics in which, when an isotropic bonded magnet is molded by mixing the magnet powder with a binding resin, the magnetic flux density (B) of the bonded magnet, in the region of B higher than the straight line for Pc (permeance coefficient)=2.0 in the second quadrant of the B-H diagram representing the magnetic characteristics at room temperature, is found always on the upper side of the straight line representing Equation (I) below, and the intrinsic coercive force (iHc) of the magnet is in the range of 5.1–9.0 kOe:

$$B = 1.25 \times \rho + 1.25 \times H \quad (I)$$

where B is the magnetic flux density, $\rho$ is the density of the bonded magnet, and H is the magnetic field.

2. The magnet powder as claimed in claim 1, wherein said structure is a nanocomposite structure in which the soft magnetic phase and the hard magnetic phase exist adjacent with each other.

3. The magnet powder as claimed in claim 1 wherein said R comprises rare-earth elements mainly containing Nd and/or Pr.

4. The magnetic powder as claimed in claim 1, wherein said R includes Pr and the ratio of Pr to the total mass of said R is 5–75 at %.

5. The magnet powder as claimed in claim 1, wherein said R includes Dy and the ratio of Dy to the total mass of said R is equal to or less than 10 at %.

6. The magnet powder as claimed in claim 1, wherein the magnet powder has been obtained by quenching a molten alloy.

7. The magnet powder as claimed in claim 1, wherein the magnet powder has been obtained by forming a quenched ribbon of the alloy on a cooling roll and then pulverizing the quenched ribbon.

8. The magnet powder as claimed in claim 1, wherein the magnet powder has been subjected to a heat treatment for at least once during the manufacturing process or after its manufacture.

9. The magnet powder as claimed in claim 1, wherein the average grain size of the magnet powder lies in the range of 0.5–150 μm.

10. An isotropic rare-earth bonded magnet formed by binding magnet powder described in claim 1 with a binding resin.

11. The isotropic bonded magnet as claimed in claim 10, wherein the bonded magnet is one already subjected to multipolar magnetization.

12. A motor having an isotropic bonded magnet as claimed in claim 10.

13. A magnetic powder comprising:

an alloy composition represented by $R_x(Fe_{1-y}Co_y)_{100-x-z-w}B_zAl_w$, wherein:

R is at least one rare earth element;

x is 8.1–9.4 at %;

y is 0–0.30;

z is 4.6–6.8 at %; and w is 0.02–0.8 at %.

14. The magnetic powder according to claim 13, wherein said alloy composition has a composite structure that comprises a hard magnetic phase and a soft magnetic phase adjacent with each other.

15. The magnetic powder according to claim 14, wherein said hard magnetic phase is the main phase.

16. The magnetic powder according to claim 13, further comprising:

a binding resin, wherein the intrinsic coercive force of said magnetic powder and binding resin is in the range of 5.1–9.0 kOe.

17. The magnetic powder according to claim 16, wherein the magnetic flux density (B), in the region of B higher than a straight line for Pc (permeance coefficient)=2.0 in the second quadrant of a B-H diagram representing the magnetic characteristics at room temperature, is always found on the upper side of the straight line representing Equation (I) below:

$$B = 1.25 \times \rho + 1.25 \times H \quad (I)$$

where B is the magnetic flux density, $\rho$ is the density of the bonded magnet, and H is the magnetic field.

18. A magnetic powder comprising:

an alloy composition represented by $R_x(Fe_{1-y}Co_y)_{100-x-z-w}B_zAl_w$, wherein R is at least one rare earth element, x is 8.1–9.4 at %, y is 0–0.30, z is 4.6–6.8 at %, and w is 0.02–0.8 at %; and a composite structure including a hard magnetic phase and a soft magnetic phase, wherein said hard magnetic phase is the main phase.

19. The magnetic powder according to claim 18, wherein the soft magnetic phase and the hard magnetic phase have a mean crystal grain size of 1–100 nm.

* * * * *

UNITED STATES PATENT AND TRADEMARK OFFICE
CERTIFICATE OF CORRECTION

PATENT NO. : 6,503,415 B1
DATED : January 7, 2003
INVENTOR(S) : Arai

It is certified that error appears in the above-identified patent and that said Letters Patent is hereby corrected as shown below:

<u>Title page,</u>
Item [57], ABSTRACT,
Line 6, "$CO_y$" should be -- $Co_y$ --;
Item [56], References Cited, OTHER PUBLICATION, "Sypmosium" should be -- Symposium --;

<u>Column 10,</u>
Line 1, "eposy" should be -- epoxy --;
Line 49, after "molding" insert -- method --;

<u>Column 12,</u>
Line 29, "$Nd_2(Fe.Co)_{14}$" should be -- $Nd_2(Fe,Co)_{14}$ --;
Line 41, "$δr(emu/g)$" should be -- $p(emu/g)$ --;

<u>Column 16,</u>
Line 3, "A10.2" should be -- $Al_{0.2}$ --.

Signed and Sealed this

Eleventh Day of November, 2003

JAMES E. ROGAN
*Director of the United States Patent and Trademark Office*